United States Patent [19]

Bloom, Jr. et al.

[11] 3,951,048
[45] Apr. 20, 1976

[54] PISTON AND ROD CONNECTION

[75] Inventors: John J. Bloom, Jr.; Paul F. McAdams, both of St. Joseph; Gene F. Hand, Stevensville; Ronald F. Katowich, St. Joseph, all of Mich.

[73] Assignee: Clark Equipment Company, Buchanan, Mich.

[22] Filed: Jan. 26, 1973

[21] Appl. No.: 326,901

[52] U.S. Cl. .................................... 92/258; 92/255; 403/261; 403/326
[51] Int. Cl.² ........................................... F16J 1/12
[58] Field of Search ............ 92/192, 193, 220, 221, 92/255, 257, 258, 256, 243, 244; 403/317, 263, 261, 255, 254, 253, DIG. 11, 309, 310, 311, 326; 123/193 P; 85/8.8

[56] References Cited
UNITED STATES PATENTS

| | | | |
|---|---|---|---|
| 861,143 | 7/1907 | Slott | 403/DIG. 7 |
| 949,993 | 2/1910 | Blanchard | 123/193 P |
| 2,210,811 | 8/1940 | Kelpsch | 403/DIG. 7 |
| 2,216,577 | 10/1940 | Stillwagon | 403/370 X |
| 2,317,070 | 4/1943 | Le Tourneau | 403/255 |
| 2,749,162 | 6/1956 | Humphrey | 85/8.8 |
| 2,998,288 | 8/1961 | Newhouse | 92/240 |
| 3,111,179 | 11/1963 | Albers et al. | 285/321 |
| 3,326,092 | 6/1967 | Murphy | 92/255 X |
| 3,334,937 | 8/1967 | Jofeh | 285/321 X |
| 3,397,893 | 8/1968 | Kampert | 92/258 X |
| 3,426,656 | 2/1969 | Bimba | 92/255 |
| 3,426,657 | 2/1969 | Bimba | 92/255 |
| 3,457,842 | 7/1969 | Tennis | 92/200 |
| 3,594,024 | 7/1971 | Hertell | 403/262 |
| 3,807,285 | 4/1974 | Phillips | 92/255 |

*Primary Examiner*—Irwin C. Cohen
*Attorney, Agent, or Firm*—McGlynn and Milton

[57] ABSTRACT

A piston and rod assembly wherein the rod has a pair of axially spaced grooves and the piston includes recesses disposed in opposite faces. One of the grooves is radially larger than the other and locking members are disposed in the grooves of the rod and extend into the recesses. A retaining means including a snap ring and an annular ring which is L-shaped in cross section are disposed radially outwardly of the locking members in the first recess for removably retaining the locking members in the first recess. A pair of threaded screws may also threadedly interconnect the retaining ring and the piston.

19 Claims, 2 Drawing Figures

PISTON AND ROD CONNECTION

BACKGROUND OF THE INVENTION

This invention relates to a piston and rod assembly, and in particular to an improvement in such an assembly utilized in hydraulic cylinders.

Various constructions are known for connecting a piston to a rod. Whatever connection is utilized, the ultimate goal is to prevent any relative movement between the piston and the rod, yet allow the piston to be removed from the rod. One of the most common is a threaded connection.

Another common connection between a piston and a rod is one employing members disposed in a groove in the rod and extending into abutting relationship with the piston. Examples of such assemblies are shown in United States Pat. Nos. 2,998,288 and 3,457,842. In one construction, blocking members are disposed in the groove in the rod and abut the piston for preventing movement of the piston relative to the rod in one direction but utilizes a snap ring for preventing movement of the piston relative to the rod in the opposite direction. The snap ring cannot withstand large forces and, therefore, such an assembly cannot be employed where larger forces are exerted on the piston tending to urge it to move relative to the rod axially in both directions. The other assembly includes a bearing band disposed annularly about the locking members to retain the locking members in the groove in the rod. Thus, the assembly is no more secure or strong than the strength of the bearing bands.

SUMMARY OF INVENTION

Accordingly, it is an object and feature of this invention to provide an improved piston and rod assembly which is easy to assembly and disassemble and includes the requisite strength and other advantages not attainable in prior assemblies.

In correlation with the foregoing objects and features, it is another object and feature of this invention to provide such an assembly which includes a groove in the rod and a recess in the piston with at least two locking members disposed in the groove in the rod and extending into the recess with retaining means disposed in the recess for retaining the locking members in the groove.

In correlation with the foregoing object and feature, it is another object and feature of this invention to provide such an assembly which includes a second groove in the rod axially spaced from the first groove and including locking members disposed therein and extending into a recess in the piston with the locking members filling the recess in the piston so that they are locked in place once in the proper position.

Other objects and attendant advantages of the present invention will be readily appreciated as the same becomes better understood by reference to the following detailed description when considered in connection with the accompanying drawings.

DRAWINGS

FIG. 1 is a fragmentary partially broken away cross-sectional view of a preferred embodiment of the subject invention; and FIG. 2 is a cross-sectional view taken substantially along line 2—2 of FIG. 1.

DESCRIPTION OF PREFERRED EMBODIMENT

Figure 1:
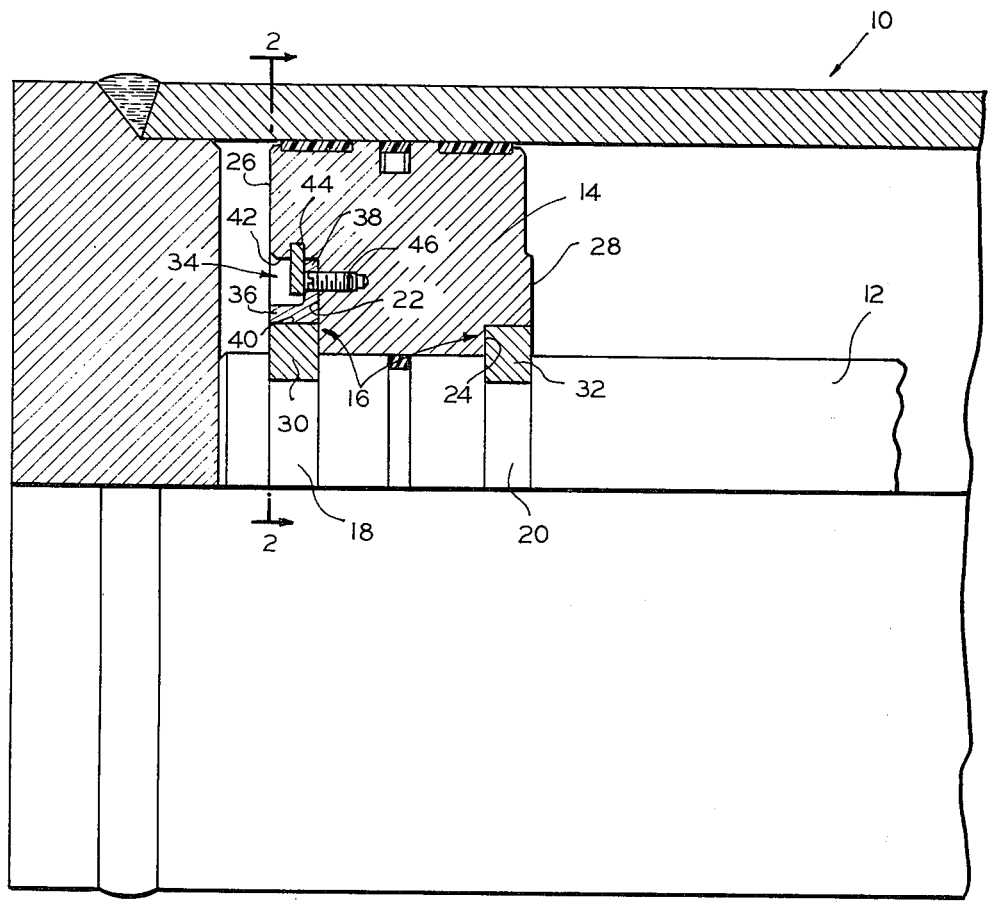

Referring to the drawings, a piston and rod assembly constructed in accordance with the instant invention is generally shown at 10.

The assembly 10 includes a rod 12 and a piston 14 disposed on the rod 12.

The assembly also includes locking means generally shown at 16 for locking the piston 14 on the rod 12.

Figure 2:
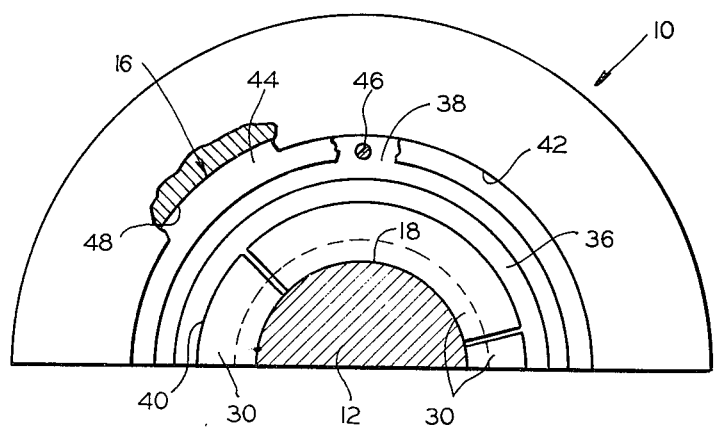

The locking means 16 includes first and second axially spaced grooves 18 and 20 in the rod 12. Also included are first and second recesses 22 and 24 extending into opposite faces 26 and 28 of the piston 14. The locking means includes a plurality of locking members 30 and 32. The locking members 30 are disposed in the groove 18 and extend radially therefrom into the first recess 22. The locking members 32 are disposed in the second groove 20 and extend radially into the recess 24. The first recess 22 is radially larger than the second recess 24 and the locking members 32 completely fill the recess 24. As illustrated in FIG. 2, there are three locking members 30 disposed in the groove 18. There are preferably three locking members 32 disposed in the groove 20. However, there may be two locking members in each of the grooves 18 or 20 or two locking members in one of the grooves with three in the other. Of course, if there are two locking members in a groove, each locking member will extend approximately 180° whereas when there are three locking members, they extend approximately 120°.

The locking means also includes retaining means generally indicated at 34 disposed in the first recess 22 radially outwardly of the locking members 30 for retaining the locking members 30 in the first groove 18. The retaining means 34 is in removable mechanical interlocking engagement with the piston 14. More specifically, the retaining means includes an annular retainer member or ring which is circular in plan view and L-shaped in cross section, the cross section including an axially extending leg 36 and a radially extending leg 38. The retainer member is disposed in the recess 22 between a radially outwardly facing surface 40 of each of the locking members 30 and a radially inwardly facing surface 42 of the recess 22. That is, the axially extending leg 36 engages the outer surface 40 of the locking members 30 and the radially extending leg 38 abuts the radially inwardly facing surface 42 of the recess 22.

The retaining means 34 further includes connector means for maintaining the retainer member or ring having the legs 36 and 38 in the recess 22. The connector means is in removable mechanical interlocking engagement with the piston 14 and includes a snap ring 44 and at least one threaded fastener 46.

The snap ring 44 is disposed in a groove 48 in the radially inwardly facing surface 42 of the recess 22. The snap ring extends into the recess and is disposed axially outwardly of the radially extending leg 38 of the retainer ring so as to be disposed in overlapping relationship with the leg 38.

The threaded fastener 46 threadedly engages the leg 38 of the retainer ring and a bore in the piston 14. The threaded fastener 46 extends axially into the piston 14 in a direction parallel to the axis of the rod 12. Preferably there are two diametrically opposed threaded fasteners 46. It will be appreciated that it was not always necessary to utilize the threaded fasteners 46 in addition to the snap ring 44.

In assembling the components, the locking members 32 are disposed in the groove 20 and the piston 14 is moved axially onto the rod 12 toward the locking members 32 to the position shown in FIG. 1. Thereafter, the locking members 30 are disposed in the groove 18. Once the locking members 30 are disposed in the groove 18, the retaining ring with the legs 36 and 38 is disposed in the recess 22. The threaded fasteners 46 are then threaded into engagement with the leg 38 and the piston 14. Thereafter the snap ring 44 is disposed in the groove 48.

Obviously, many modifications and variations of the present invention are possible in light of the above teachings. It is, therefore, to be understood that with the scope of the appended claims, the invention may be practiced otherwise than as specifically described.

The embodiments of the invention in which an exclusive property or privilege is claimed are defined as follows:

1. A piston and rod assembly comprising; a rod; a piston disposed on said rod; locking means for locking said piston on said rod; said locking means including a first groove in said rod, a first recess in said piston, at least two locking members disposed in said groove and extending into said recess and retaining means disposed in said recess for retaining said locking members in said groove, all of said first groove, said first recess, said locking members and said retaining means being aligned radially outwardly of the axis of said rod, said retaining means being disposed radially outwardly of said locking members for retaining said locking members in said groove, said retainer means including a retainer member disposed in said recess between a radially outwardly facing axially extending surface of each of said locking members and a radially inwardly facing axially extending surface of said recess and connector means for maintaining said retainer member in said recess, said retainer member having an axially extending surface engaging said axially extending surface of said locking members so that said connector means is free of axial loads.

2. An assembly as set forth in claim 1 wherein said retaining means is in removable mechanical interlocking engagement with said piston.

3. An assembly as set forth in claim 1 wherein said connector means is in removable mechanical interlocking engagement with said piston.

4. An assembly as set forth in claim 3 wherein said connector means includes at least one threaded fastener in threaded engagement with said retainer member and said piston.

5. An assembly as set forth in claim 4 wherein said threaded fastener extends axially into said piston in a direction parallel to the axis of said rod.

6. An assembly as set forth in claim 5 wherein said connector means further includes a snap ring disposed in a groove in said radially inwardly facing surface of said recess and extending into said recess so as to overlap said retainer member.

7. An assembly as set forth in claim 3 wherein said connector means includes a snap ring disposed in mechanical interlocking engagement with said piston.

8. An assembly as set forth in claim 7 wherein said snap ring is disposed in a groove in said radially inwardly facing surface of said recess and extends into said recess so as to overlap said retainer member.

9. An assembly as set forth in claim 3 wherein said retainer member is circular in plan view and L-shaped in cross section with said L-shaped cross section including an axially extending leg defining said axially extending surface engaging said locking members and a radially extending leg abutting said radially inwardly facing surface of said recess.

10. An assembly as set forth in claim 9 wherein said connector means includes a snap ring disposed in a groove in said radially inwardly facing surface of said recess and extending into said recess axially outwardly of said radially extending leg and in overlapping relationship therewith.

11. An assembly as set forth in claim 10 wherein said connector means further includes at least one threaded fastener in threaded engagement with said radially extending leg and said piston.

12. An assembly as set forth in claim 11 wherein said locking means also includes a second groove in said rod axially spaced from said first groove, at least one additional locking member disposed in said second groove and in mechanical interlocking engagement with said piston.

13. An assembly as set forth in claim 12 wherein said piston has a second recess therein radially aligned with said second groove, and said additional locking member extends radially into said second recess.

14. An assembly as set forth in claim 13 wherein additional locking member engages a radially inwardly facing surface of said second recess.

15. An assembly as set forth in claim 1 whrein said locking means also includes a second groove in said rod axially spaced from said first groove, a plurality of additional locking members disposed in said second groove and in mechanical interlocking engagement with said piston.

16. An assembly as set forth in claim 1 wherein said recesses extend into opposite radial faces of said piston.

17. An assembly as set forth in claim 16 wherein said first recess is radially larger than said second recess and all of said locking members are identical.

18. A piston and rod assembly comprising: a rod; a piston disposed on said rod; locking means for locking said piston on said rod; said locking means including first and second axially spaced grooves in said rod, first and second recesses extending into opposite faces of said piston, a plurality of locking members disposed in said grooves and extending radially therefrom and into said first and second recesses, said locking members radially filling said second recesses, said locking members in said first recess having a radially outwardly facing axial surface, said first recess being radially larger than said second recess, and retaining means connected to said piston and disposed in said first recess radially outwardly of each locking member therein and having an axially extending surface engaging said axial surface of said locking members for retaining the latter in said first groove so that said retaining means is free of axial loads.

19. A piston and rod assembly comprising: a rod; a piston disposed on said rod; locking means for locking said piston on said rod; said locking means including a groove in said rod and extending about the periphery thereof, said groove having axially spaced first and second radially extending side walls interconnected by an axially extending bottom, a recess in said piston peripherally coextensive with said groove and having a radially extending surface aligned with said first side wall and an axially extending surface spaced radially from said rod, at least two locking members disposed in said groove and extending into said recess, said locking members including radial surfaces in abutting engagement with said first side wall and a portion of said radially extending surface, said locking members having a radially outwardly facing axial surface, and retaining means connected to said piston and disposed in said recess in engagement with said radially extending surface and having an axially extending surface engaging said axial surface of said locking members for retaining said locking members in said groove without transmitting axial loads to said retaining means.

* * * * *